United States Patent [19]

Kratel et al.

[11] Patent Number: 4,985,163
[45] Date of Patent: Jan. 15, 1991

[54] SHAPED HEAT-INSULATING BODY AND PROCESS OF MAKING THE SAME

[75] Inventors: Günter Kratel, Durach-Bechen; Hans Katzer, Kempten, both of Fed. Rep. of Germany

[73] Assignee: Consortium fur Elektrochemische Industrie GmbH, Munich, Fed. Rep. of Germany

[21] Appl. No.: 873,285

[22] Filed: Jun. 4, 1986

Related U.S. Application Data

[63] Continuation of Ser. No. 193,768, Oct. 3, 1980, abandoned.

[30] Foreign Application Priority Data

Nov. 17, 1979 [DE] Fed. Rep. of Germany ....... 2946476

[51] Int. Cl.$^5$ .......................... C04B 33/32; E04B 1/74
[52] U.S. Cl. ......................................... 252/62; 264/42; 264/43; 264/332; 501/80; 501/87; 501/89; 501/92; 501/96; 501/98
[58] Field of Search .......................... 264/332, 42, 43; 501/92, 80, 87, 89, 96, 98; 252/62

[56] References Cited

U.S. PATENT DOCUMENTS 3,055,831  9/1982  Barnett et al. ........................ 252/62

FOREIGN PATENT DOCUMENTS

| | | |
|---|---|---|
| 0029227 | 6/1983 | European Pat. Off. . |
| 1671186 | 9/1971 | Fed. Rep. of Germany . |
| 2524096 | 12/1976 | Fed. Rep. of Germany . |
| 2806367 | 8/1978 | Fed. Rep. of Germany . |
| 2748307 | 5/1979 | Fed. Rep. of Germany . |
| 2754956 | 6/1979 | Fed. Rep. of Germany . |
| 1205572 | 9/1970 | United Kingdom . |
| 1537098 | 12/1978 | United Kingdom . |
| 1580909 | 12/1980 | United Kingdom . |

OTHER PUBLICATIONS

Kirk–Othmer, Encyclopedia of Chemical Technology, Second Completely Revised Edition, vol. 18, pp. 134–136 (Copyright 1969).
Handbook of Chemistry and Physics, 55th Edition, Edition, Editor–Robert C. Weast, Ph.D., Published by CRC Press, (1974–1975), p. E-17.

*Primary Examiner*—James Derrington
*Attorney, Agent, or Firm*—Collard, Roe & Galgano

[57] ABSTRACT

A method for producing shaped heat-insulating bodies based on water-insoluble oxidic metal compounds particularly of the elements silicon and aluminum, clouding agents and other additives, whereby the bodies are thermally hardened and have a heat conductivity of 0.02 to 0.1 W/K.m at temperatures of approximately 300° to 500° C. and are comprised of (a) 100 parts by weight of water-insoluble oxidic metal compounds having a BET-surface of 10 to 700 m$^2$/g, with the provision that at least 5% by weight of these compounds have a BET-surface of at least 50m$^2$/g; (b) 0 to 100 parts by weight of mineral clouding agents having at least one absorption maximum in the wave length range of 1.5 to 10 μm; and (c) 0.1 to 30 parts by weight of elements capable of forming a solid oxide having a standard formation enthalpy of less than minus 900 kJ/Mol. In addition, 0–100 parts by weight of mineral fibers can be added. The mixture is then put into a mold of the desired shape, compressed to densities between 0.15 to 1 g/cm$^3$, and heated to temperatures between 200° to 900° C. so that a chemical reaction will take place. The cooled heat-insulating body so formed maybe used as a structural element in the building industry, for electrical devices and for various installations.

19 Claims, No Drawings

SHAPED HEAT-INSULATING BODY AND PROCESS OF MAKING THE SAME

This is a file-wrapper continuation application of application Ser. No. 193,768, filed Oct. 3, 1980, now abandoned.

This invention relates to a shaped heat-insulating body based on water-insoluble oxidic metal compounds, particularly of the elements silicon and/or aluminum, opacifiers (or clouding agents) and, if desired, mineral fibers, and to a process of making the same.

Shaped bodies consisting of a mixture of pyrogenically produced silicic acid with clouding agents and mineral wool, made by exerting high pressure and by subsequent coating with, e.g., potassium water glass, are known, for instance from German Application DE-OS No. 27 47 663. Another known method for making such shaped bodies is known from German Application DE-OS No. 27 12 625, in which a mixture of pyrogenically produced silicic acid and clouding agent are compressed while being heated in an enveloping means made of woven glass, paper, shrunk foil, or similar material, so that the insulating plate thus formed is held together by the tension of the enveloping means that is shrinking while cooling.

In the production of conventional heat-insulating plates, a highly dispersed silicic acid and a clouding agent are simply pressed together at high pressure. These conventional plates are only useful for applications where no mechanical stress is made to bear on them, or there is no risk of their becoming wet. Especially in the latter case, the plate is completely disintegrated when wetted. Even an enveloping means cannot prevent this shortcoming, especially if the envelope is slowly disintegrated or dissolved by temperature exposure.

While the above-mentioned difficulties are overcome by the use of mineral binders, a coating of this type is used up by the mixture of the binder and other additives with water, so that the plate is soaked through to a certain depth. That, however, causes a structural change of the plate, for example, by the filling of pores in these parts, so that the insulating capacity becomes partially lost. Moreover, the plate cannot be worked mechanically, e.g., it cannot be changed to smaller dimensions by sawing, filing and the like, without losing at least part of its strength due to the damage to the binding layer. The same problem exists also in a superficial hydrophobing, as suggested, e.g., in DE-OS No. 27 54 517.

The Japanese unexamined Application No. 54 03 133 (1979) [see Chem Abstr. 90 (1979) 191 438 q] proposes to add ground iron to zirconium earth, compress this mixture to plates, and finally to burn them. However, burning temperatures usually cause sintering to occur in such finely dispersed materials, which generally involves a change of volume and a change of heat conductivity, due to the formation of vitreous structures and bridges of heat.

It is an object of the present invention to overcome the disadvantages of the known processes for making heat-insulating bodies.

It is a further object to provide heat insulating shaped bodies having, as compared to merely compressed bodies, no increased heat conductivity, or no markedly increased heat conductivity, and possessing a uniform high strength throughout the shaped body. The shaped bodies should also be capable of being subsequently mechanically processed without losing their original strength.

The objects are fulfilled by the shaped heat-insulating bodies according to the invention which have the following characteristics:

The bodies are thermally hardened, have a heat conductivity of 0.02 to 0.1 W/K.m at temperatures of about 300° to about 500° C., and consist of:

(a) 100 parts by weight of water-insoluble oxidic metal compounds, especially compounds of silicon and/or aluminum, having a BET-surface of 10 to 700 m$^2$/g, with the provision that at least 5% by weight of these compounds have a BET-surface of at least 50 m$^2$/g;

(b) 0 to 100, preferably 5 to 80 parts by weight of mineral clouding agents having at least one absorption maximum in the wave length range of 1.5 to 10 µm;

(c) 0.1 to 30, preferably 0.5 to 15 parts by weight of such elements, which can form a solid oxide having a standard formation enthalpy of less than minus 900 kJ/Mol.; and (d) 0 to 100, preferably 15 to 50 parts by weight of mineral fibers.

The shaped heat-insulating bodies according to the invention are made from highly dispersed materials as follows:

A mixture is made of the following components:

1. 100 parts by weight of water-insoluble oxidic metal compounds, especially of the elements silicon and/or aluminum having a BET-surface of 10 to 700 m$^2$/g, at least 5% by weight of the entire weight of these compounds having a BET-surface of at least 50 m$^2$/g, 0 to 100, preferably 5 to 80 parts by weight of mineral clouding agents having at least one absorption maximum in the wave length range of 1.5 to 10 µm;

about 0.1 to 30, preferably 0.5 to 15 parts by weight of such elements and/or mixtures of such elements and/or compounds of such elements which can form a solid oxide with a standard formation enthalpy of less than minus 900 kJ/Mol.; and 0 to 100, preferably 15 to 50 parts by weight of mineral fiber.

The mixture is made up of the dry materials with maintenance of the structure of the components.

2. The mixture is then brought into the desired shape, e.g., in a mold, then 3. compressed to densities of 0.15 to 1 g/cm$^3$, preferably 0.2 to 0.5 g/cm$^3$, and 4. heated to about 200° to 900° C., but at least to such a temperature that a chemical reaction will take place.

The shaped heat-insulation bodies according to the invention, are based, as mentioned, to a large extent on water insoluble oxidic metal compounds a, particularly of the elements silicon and/or aluminum. Among the metal compounds are understood to be the oxides and mostly insoluble salts, for example, zirconium dioxide, titanium dioxide, but preferably, silicon dioxide and aluminum oxide, but also water insoluble silicates and alumosilicates, having surfaces of 10 to 700 m$^2$/g, measured by the BET method (compare ASTM Special Technical Publication No. 51, 1941, p. 95 ff). The oxidic metal compounds may be produced by precipitation or, in the case of the highly dispersed oxides, by flame hydrolysis. Particularly preferred are the oxides made according to the latter technique which is conventional in this field, especially the so-called pyrogenically produced silicon dioxide and aluminum oxide as well as their mixtures and mixed oxides. These highly dispersed oxides have perferably BET-surfaces of 50 to 700, especially 100 to 400 m²/g, and still more preferred, 200 to 380 m²/g.

Clouding agents b, which are useful for the purposes of the invention are inorganic oxides, mixed oxides, carbides, and nitrides having at least one absorption maximum in the range of the electromagnetic waves with wave lengths of 1.5 to 10 μm. By way of example, one may mention Ilmenite, titanium dioxide, silicon carbide, iron oxide, chromium oxide, zirconium oxide, manganese dioxide, iron II- iron III-mixed oxide, and mixtures thereof. These clouding agents have frequently BET-surfaces of 0.2 to 20 m²/g. It is also possible, and is frequently advantageous, to apply the oxidic metal compounds a and the clouding compounds b in the form of agglomerated mixtures as, e.g., described in Kratel et al, U.S. patent application Ser. No. 102,510. (German patent application No. P 28 54 984.0).

Furthermore, other components are admixed to the mixture preparing the shaped insulating bodies of the invention—namely, such elements and/or mixtures and/or compounds which are capable of forming a stable, solid oxide having a standard formation enthalpy of less than minus 900 kJ/Mol. By "standard formation enthalpy of less than minus 900 kJ/Mol.", we understand the amount of heat set free at the reaction of the elements forming 1 Mol, oxide at 298K, which in the given case is more than 900 kJ/Mol., with the elements being present in their standard conditions, (stable forms at 101, 325 kPa pressure and 298K) (see "SI Chemical Data", John Wiley & Sons, Australasia Pty Ltd, Sydney 1971—German text "Aylward/Findlay, Datensammlung Chemie in SI-Einheiten", Taschentext 27, Verlag Chemie-Physik Weinheim/Bergstr., 1975.)

At least one of the solid oxides of these elements is insoluble or almost insoluble in cold water, has basic or slightly acidic reaction and does not have marked oxidizing or reducing properties. Examples of elements forming such oxides are boron, aluminum, silicon, antimony, zirconium, titanium, chromium, manganese, and iron. It is possible to use compounds of the mentioned elements with one another, e.g., borides such as zirconium boride, aluminum boride, and titanium boride, but also compounds of these elements, especially of boron, with calcium and with carbon, thus, calcium boride and boron carbide. Moreover, we have to mention silicides, e.g., calcium silicide and calcium-aluminum silicide. Of course, it is possible to use mixtures of these elements and compounds. Preferred are calcium boride, boron carbide, titanium boride and especially silicon, aluminum and, most of all, iron.

Mineral fibers to be used for the purposes of the invention are glass wool, rock wool, slag wool, ceramic fibers, such as the ones made fom the melt of aluminum oxide and/or silicon dioxide.

It has been proven advantageous in many cases to add up to 20 parts by weight, preferably 10 parts by weight of other additives, especially mineral pigments such as coloring materials such as used in the ceramic and china industries below the glazing; furthermore, alkaline earth oxide, e.g., magnesium oxide and particularly calcium oxide.

Up to 95% by weight referring to the total weight of component a of the oxidic metal compounds, may be substituted by SiO₂ fillers which are formed as wastes in the production of silicon and ferro-silicon; they may be filter dusts e.g. obtained as SiO₂ filler "SiO₂-Füller N" by the firm Süddeutsche-Kalkstickstoff-Werke AG, Trostberg, Federal Republic of Germany, a silicon oxide filler having a specific BET-surface of 10 to 20 m²/g.

The $SiO_2$-filler N is a light grey, amorphous powder and is composed of:

| | |
|---|---|
| $SiO_2$ | 84 to 92% |
| Total iron (as $Fe_2O_3$) | 0.9 to 6% |
| Free iron-mainly in the form of iron dust | 0.25 to 0.75% |
| $Al_2O_3$ | 0.6 to 1.2% |
| MgO | 1.2 to 2.5% |
| CaO | 0.7 to 3.2% |
| Free carbon | 1 to 6% |

In view of this composition, a further addition of clouding agents, or of such other elements and/or mixtures and/or compounds of elements which form a stable oxide with a standard formation enthalpy of less than minus 900 kJ/Mol., can be dispensed with partly or entirely in the production of the heat-insulating shaped bodies according to the invention.

The mentioned components are mixed as powders in dry state with maintenance of their structure, so that their particle size will, in general, be below 1 mm, more particularly, below 0.5 mm, and mixing occurs in such a manner that preferably no grinding will take place.

The mixture obtained is filled into a mold and compressed preferably at a pressure of 10 to 200 N/cm². While pressure is being applied, the gases present in the mixture should be capable of escaping. Therefore, this operation should preferably be carried out with the application of a vacuum. The degasification can also be carried out or started before the mixture is compressed. In this manner, shaped bodies, e.g., plates, profiles, and tubes are obtained with densities of about 0.15 to 1, preferably 0.2 to 0.5 g/cm³.

After the bodies are taken out of the mold, they are heated for several minutes up to several hours, such as, for example ¼ hour to about 4 hours, preferably ½ an hour to 2 hours, to temperatures of 200° to 900°, preferably 500° to 800° C. The heat transfer to the body can be brought about by convection, heat radiation, or heat conduction. Because of the uniformity of the effect, heat radiation and heat transfer by convection of hot gases are preferred. The heating can take place at the pressure of the surrounding atmosphere (about 1 bar) or at higher pressures. It is also possible to carry out the heating in the mold but this is not the preferred mode of operation.

The heating takes place preferably at the most at such pressures, which do not cause a further decrease of volume of the body to occur, and at least at temperatures at which a chemical reaction, preferably an exothermic reaction, will set in. After the onset of the hardening reaction, it is preferable not to heat the body from the outside to still higher temperatures.

After the reaction which causes a marked increase in the strength of the heat-insulating body in its entire volume, and toward forces which are exerted in various directions is terminated, the body is slowly cooled down. This can be brought about by letting the heating device, e.g., a chamber furnace, cool down, or by removal of the body from the heating device, which may be a tunnel furnace. The hardening may be carried out in a known manner, e.g., such as is performed in ceramic industries, while observing the conditions mentioned above and the measures according to the invention, the operations being performed in batches (discontinuously), in fixed cycle operations (partly continuously), or on a conveyor belt (continuously).

The course of the reaction during the thermal hardening, particularly at the start and at the end of the chemical reaction, can be measured by differential thermoanalysis. Here, change in temperatures of the formed body are observed by thermo-sensors capable of indicating the heat tone of the hardening reaction as compared to the temperature of the surroundings or the outer heat source, e.g., the hardening furnace, the measurement following the changes, and, if necessary, controlling the same.

When maintaining the indicated composition and mentioned temperatures, there will occur, upon heating, a marked strengthening, which is surprising, but obviously no sintering will take place.

The heat conductivity of the hardened shaped body of 0.02 to 1 W/K.m (measured by tentative standard DIN 51 046 or ISO/TC 33, respectively, at about 300° to 500°C.) remains practically the same as one of the compressed shaped body, that is to say that obviously no heat bridges are formed by vitrification. It is also surprising that practically no changes of shape, volume and porosity of the heat-insulating body will take place. In general, the BET-surface of the shaped body remains practically unchanged.

It is true that in some cases a certain decrease in the BET-surface is found upon heating, but in most cases, the changes are definitely 10%, e.g., about 6%, referring to the starting value.

On the other hand, a definite strengthening of the shaped body is unexpectedly observed, not only superficially, but over the entire cross section. Thus, the compressive strength increases mostly by 1.5 to 5 fold, frequently by more than two fold of the original value of the shaped body before being heated, to about 0.5 to 3MN/m$^2$, and the flexural tensile strength reaches values of about 0.05 to about 0.5N/mm$^2$. The porosity of the heat-insulating body according to the invention is, in general, about 50 to 90% calculated on the total volume of the body.

Most surprising is the strength of the heat-insulating body according to the invention upon exposure to water. The compressive strength remained as above, stated in the range of 0.5 to 3MN/m$^2$, whereas shaped bodies not made according to the invention, either disintegrated immediately upon contact with water or the compressive strength decreased considerably.

The heat-insulating body according to the invention has the distinctive advantage that due to its composition and the high strength, it can be very well worked mechanically, e.g., by sawing, cutting, grinding, filing, or drilling, without losing its strength. Thus, it can be easily fitted into given mounting devices, with very good strength at the edges and corners. Nails or the like can be driven in without difficulty.

As an oxidic component a, only SiO$_2$, e.g., pyrogenically produced, is often used, and, if desired, SiO$_2$-filler N. In this way, shaped bodies are obtained which upon use as heat insulation may be heated up to about 950° C. without losing their insulating capacity or becoming distorted by sintering. Such temperatures may even be exceeded for a short time by, e.g., 50° to 100° C.

When the shaped body is to be used at even higher temperatures, the silicic component is partly or entirely replaced by highly dispersed oxides with higher phase transition temperatures than SiO$_2$, e.g., titanium oxide, preferably aluminum oxide. With increasing amounts of such oxides, mainly aluminum oxide, the temperature strength of the insulating body according to the invention will increase. With complete replacement of silicon dioxide by such oxides, mainly aluminum oxide, the temperature range in which the body can be used without noticeable loss of its properties, can be exended to 1500° C., preferably 1200° C.

Due to its high heat-insulating properties, it is often not necessary to make the entire body from such higher melting oxides, mainly aluminum oxide. Frequently, it is advantageous for reasons of economy to make a heat-insulating body which is simply called "Layered shaped Body". This is to indicate that part of the body, which faces the heat source, contains the higher melting oxides, preferably aluminum oxide, as component a, whereas the other parts contain at least partly SiO$_2$ and other SiO$_2$ fillers, e.g., SiO$_2$-filler N, as component a. The layered shaped body is produced according to the invention as above described, the different parts of the mold being filled with mixtures as desired.

It is astonishing that these layered bodies do not show any differences in the compressive strength of the differently composed parts, and the differently composed parts are bonded together almost without differences in strength at the boundary faces. The transition of the several layers may also be brought about in several steps.

If the heat-insulating body according to the invention is exposed to humidity, especially at low temperatures, e.g., in the building industry or the refrigeration industry, it may be advantageous to use hydrophobing according to the process described in DE-OS No. 27 54 517.

The heat-insulating shaped body according to the invention may be used in the building industries, e.g., for the heat insulation of buildings, especially since the body is not combustible and is flame resistant. This makes it more useful in electrical devices particularly since the body is also an electric insulator; in many installations, it is useful because it is not corrosive. Another use is the application for insulating high-temperature batteries, e.g., sodium-sulfur batteries, for transformers, winding bodies for electric coils, heating spirals (such as used in heating plates for cooking as described in DE-OS No. 27 44 079 and 28 06 367) for the insulation of heat accumulators, furnaces, water and other pipe lines, electric conductors for the insulation and protection of computers, flight recorders, and tanks for combustible liquids.

In the following, the invention will be more fully described in a number of examples, which are however given for illustration and not for limitation.

In the examples and comparison tests, plates were used as test bodies which were tested before and after heating. The values obtained in the tests are characterized by "V" before heating and "N" after heating.

EXAMPLE 1

48.5 g of a filler having a BET-surface of about 250 m$^2$/g consisting of pyrogenically produced silicic acid (HDK), which was co-agglomerated according to the process described in DE-OS No. 28 54 984 with 15% by weight of Ilmenite (FeTiO$_3$) calculated on the total weight of the finished filler; and 1.5 g of commercial calcium boride (CaB$_6$-PL fine, made by the firm Elektroschmelzwerk Kempten GmbH, Munich) were well mixed in a mixer. In a hand press, a test plate was produced from the homogeneous mixture, having a $\phi=11$ cm, thickness 1.8 cm, density 0.29 g/cm$^3$. After a first testing for compressive strength (according to DIN No. 57 302), the test plate was heated in a chamber oven for 2 hours to 735° C. and tested once more after cooling. The plate was then hard and mechanically workable, its dimensions were unchanged.

| Compressive Strength | V | 1.22 MN/m$^2$ |
|---|---|---|
| | N | 2.65 MN/m$^2$ |

EXAMPLE 2

Example 1 was repeated with the changed composition 47.5 g HDK, co-agglomerated with 15% by weight of titanium dioxide, calculated on the filler, and 2.5 g of commercial calcium boride.

| Compressive Strength | V | 1.04 MN/m$^2$ |
|---|---|---|
| | N | 2.22 MN/m$^2$ |

EXAMPLE 3

Example 1 was repeated with the following changes: 47.5 g instead of 48.5 g filler (component a) of Example 1 and 2.5 g commercial titanium boride (TiB$_2$-PL-cyclon dust of the firm Elektroschmelzwerk Kempten GmbH, Munich).

| Compressive Strength | V | 1.22 MN/m$^2$ |
|---|---|---|
| | N | 2.25 MN/m$^2$ |
| Heat Conductivity (Tentative Standard DIN 51 046) | | |
| | N | 0.030 W/K m at 300° C. |

EXAMPLE 4

75.2 g filler having a BET-surface of about 200 m$^2$/g, prepared from pyrogenically produced silicic acid by agglomeration according to German patent application No. P 28 54 984.0 with 34% by weight of Ilmenite, calculated on the total weight of the filler;

4 g of a commercial aluminum silicate fiber (Kerlane ® 45, made by the firm SAVOIE-Feuerfest, Dusseldorf); and 0.8 g of the commercial calcium boride mentioned in Example 1, were well mixed in a mixer and compressed to a plate, $\phi$ 18 cm, thickness 1 cm, density 0.31 g/cm$^3$. Subsequently, the plate was heated in a chamber oven for 2 hours to 750° C. After cooling, the plate could be worked mechanically; it was slightly elastic.

| Compressive Strength | V | 0.69 MN/m$^2$ |
|---|---|---|
| | N | 1.30 MN/m$^2$ |
| Bending Strength (DIN 53 423) | V | 0.12 N/mm$^2$ |
| | N | 0.22 N/mm$^2$ |
| Pore Volume, calculated on the total volume | | |
| | V | 84 vol. % |
| | N | 86 vol. % |
| BET-surface | V | 167 m$^2$/g |
| | N | 156 m$^2$/g |

Subsequently, the plate was placed in water until it was completely saturated. The compressive strength of the plate was 1.08MN/m$^2$.

COMPARISON TEST A

Examples 1 and 4 were repeated except that the test plates were placed in water immediately after having been compressed without being heated and were saturated with water. The plate of Example 1 disintegrated, the plate of Example 4 had a compressive strength of only 0.13MN/m$^2$.

EXAMPLE 5

Example 4 was repeated with the changed composition:

106.8 g filler of Example 4, 12 g mineral fiber of Example 4, and 1.2 g titanium boride of Example 3. The plate dimensions were $\phi$ 18 cm, thickness 2 cm, density 0.24 g/cm$^3$.

| Compressive Strength | V | 0.53 MN/m$^2$ |
|---|---|---|
| | N | 1.36 MN/m$^2$ |

EXAMPLE 6

Example 5 was repeated with the change that instead of titanium boride, 1.2 g of commercial aluminum boride powder was used.

| Compressive Strength | V | 0.72 MN/m$^2$ |
|---|---|---|
| | N | 1.32 MN/m$^2$ |

EXAMPLE 7

Example 5 was repeated with the exception that instead of titanium boride, 1.2 g of a filter dust was used, formed during boron carbide production (Elektroschmelzwerk Kempten, Munich).

| Compressive Strength | V | 0.52 MN/m$^2$ |
|---|---|---|
| | N | 1.40 MN/m$^2$ |
| Heat Conductivity (Tentative Standard DIN 51 046) | | |
| | N | 0.028 W/K m at 300° C. |

EXAMPLE 8

116.4 g of commercial pyrogenically prepared silicic acid (Wacker HDK ® T 30, BET-surface about 300 m$^2$/g) and 3.6 g boron powder, grain size $\leq 50$ μm, were well mixed in a mixer and compressed to a plate of the $\phi$ 18 cm, thickness 2.0 cm, density 0.24 g/cm$^3$ The plate was then heated in a chamber oven for 2 hours at 735° C. After cooling, the plate was capable of being worked mechanically.

| Compressive Strength | V | 0.80 MN/m$^2$ |
|---|---|---|
| | N | 2.33 MN/m$^2$ |

EXAMPLE 9

Example 8 was repeated with the exception that instead of boron, 3.6 g silicon powder, (grain size $\leq 100$ μm) were used.

| Compressive Strength | V | 0.78 MN/m$^2$ |

-continued

| | N | 1.15 MN/m² |

EXAMPLE 10

Example 8 was repeated with the exception that instead of boron, 3.6 g iron powder, grain size ≦100 μm, were used.

| Compressive Strength | V | 0.65 MN/m² |
| | N | 1.63 MN/m² |

EXAMPLE 11

Example 8 was repeated with the exception that instead of boron, 2.6 g aluminum powder, grain size ≦100 μm, were used.

| Compressive Strength | V | 0.74 MN/m² |
| | N | 1.58 MN/m² |

EXAMPLE 12

45.4 g SiO₂-filler N (Süddeutsche Kalkstickstoff Werke AG, Trostberg), 19.4 g filler from Example 4 and 7.2 g of the mineral fiber of Example 4 were well mixed in a mixer. The compressed plate made therefrom φ 11 cm, thickness 2 cm, density 0.38 g/cm³, was subsequently heated for 2 hours in a chamber oven to 750° C. After cooling, the hard plate could be worked mechanically.

| Compressive Strength | V | 0.25 MN/m² |
| | N | 1.17 MN/m² |
| Heat Conductivity | N | 0.039 W/K m at 300° C. |

EXAMPLE 13

116.4 g of HDK as in Example 8, 1.48 g silicon powder, grain size ≦100 μm, and 2.97 g powdered calcium oxide were well mixed in a mixer. The compressed plate made therefrom (φ 18 cm, thickness 2 cm, density 0.24 g/cm³) was heated in a chamber oven for 2 hours to 735° C. After cooling, the hard plate could be worked mechanically.

| Compressive Strength | V | 0.73 MN/m² |
| | N | 2.33 MN/m² |

What is claimed is:

1. A method of making a shaped heat-insulating body based on water-insoluble oxidic metal compounds, clouding agents and other additives, comprising the steps of:
    (a) mixing in a dry state with maintenance of the structure of the compounds, 100 parts by weight of water-insoluble oxidic metal compounds having a BET-surface of 10 to 700 m²/g wherein at least 5% by weight of the total weight of these compounds have a BET-surface of at least 50 m²/g said water-insoluble oxidic metal compounds being selected from the group consisting of silicon and aluminum compounds;
    0 to 100 parts by weight of mineral clouding agents having at least one absorption maximum in the wave length range of 1.5 to 10 μm; and
    about 0.1 to 30 parts by weight of an additive selected from the group consisting of borides, boron carbide, and a combination thereof capable of forming a solid oxide with a standard formation enthalpy of less than minus 900 kJ/Mol.;
    (b) transferring the mixture into a mold of desired shape;
    (c) compressing the mixture to density of between 0.15 to 1 g/cm³; and
    (d) heating to temperatures of between 200° to 900° C., so that a chemical reaction will take place, thereby obtaining a thermally hardened, non-vitreous body having a porosity of 50-90%, calculated on the total volume of the body, which has a heat conductivity of 0.02 to 0.1 W/Km at temperatures of approximately 300° to 500° C.

2. The method as recited in claim 1, wherein the water-insoluble oxidic metal compounds of step (a) are selected from the group consisting of silicon and aluminum compounds.

3. The method according to claim 1, wherein step (a) additionally comprises the step of adding 0 to 100 parts by weight of mineral fibers.

4. The method according to claim 1, wherein the heating in step (d) is carried out at between 735° to 750° C.

5. The method according to claim 1, wherein the compounds selected from the group consisting of borides, boron carbide and a combination thereof capable of forming a solid oxide in step (a) comprise 0.5 to 15 parts by weight of such compounds.

6. The method according to claim 1, wherein the mineral clouding agents of step (a) comprise 5 to 80 parts by weight.

7. A heat-insulating shaped body made according to claim 1 comprising a body which is thermally hardened by heating the body at least to a temperature at which a chemical reaction sets in within the range of 200° to 900° C., has a non-vitreous structure, a porosity of 50-90% calculated on the total volume of the body, and a thermal conductivity of 0.02 to 0.1 W/K.m at temperatures of approximately 300° to 500° C., and which comprises:
    (a) 100 parts by weight of water-insoluble oxidic metal compounds having a BET-surface of 10 to 700 m²/g, with the provision that at least 5% by weight of the total weight of these compounds have a BET-surface of at least 50 m²/g, said water-insoluble oxidic metal compounds being selected from the group consisting of silicon and aluminum compounds;
    (b) 0 to 100 parts by weight of mineral clouding agents having at least one absorption maximum in the wave length range of 1.5 to 10 μm; and
    (c) 0.1 to 30 parts by weight of compounds selected from the group consisting of borides, boron carbide and a combination thereof capable of forming a solid oxide having a standard formation enthalpy of less than minus 900 kJ/Mol.

8. The heat-insulating body according to claim 7, wherein the water-insoluble oxidic metal compounds defined under (a) consist essentially of compounds of silicon and aluminum.

9. The heat-insulating body according to claim 7, additionally comprising 0–100 parts by weight of mineral fibers.

10. The heat-insulating body according to claim 7, wherein the amount of clouding agent defined under (b) is 5 to 80 parts by weight.

11. The heat-insulating body according to claim 7, wherein the amount of compounds selected from the group consisting of borides, boron carbide and a combination thereof capable of forming a solid oxide as defined under (c) is 0.5 to 15 parts by weight.

12. The heat-insulating body according to claim 7, wherein the mineral clouding agents of step (b) consist essentially of compounds of Ilmenite, titanium dioxide, silicon carbide, iron oxide, chromium oxide, zirconium oxide, manganese dioxide, iron II- iron III-mixed oxide, and mixtures thereof.

13. The heat-insulating body according to claim 7, wherein said borides of step (c) are selected from the group consisting of zirconium boride, aluminum boride, titantium boride, calcium boride and a combination thereof.

14. The heat-insulating body according to claim 9, wherein the mineral fibers consist essentially of glass wool, rock wool, slag wool, and ceramic fibers.

15. Process for the manufacture of heat insulating shaped articles based on finely dispersed water-insoluble oxidic metal compounds, especially those based on silicon and/or aluminum, inorganic binders, optionally including opacifiers, mineral fibers, and additional additives, the article having thermal conductivities of from 0.02 to 0.1 W/(mK) at temperatures of from approximately 300° to approximately 500° C., comprising the steps of:
(1) mixing:
  (a) 100 parts by weight of water-insoluble oxidic metal compounds selected from the group consisting of silicon and aluminum compounds, the compounds having a BET specific surface area of from 10 to 700 m$^2$/g, and at least 5% by weight of the total weight of such compounds having a BET specific surface area of at least 50 m$^2$/g;
  (b) from 0 to 100 parts by weight of mineral opacifiers having at least one absorption maximum in the wave-length range of from 1.5 to 10 μm;
  (c) compounds selected from the group consisting of borides, boron carbide and a combination thereof capable of forming at least one solid oxide with a standard enthalpy of formation of less than −900 kJ/mol, the oxide having no distinctive oxidizing or reducing properties, being from only sparingly soluble to insoluble in cold water, and being from basically reactive to weakly acidically reactive, in such amounts that the compounds are present in amounts of from 0.1 to 30 parts by weight;
  (d) from 0 to 100 parts by weight of mineral fibers, and
  (e) from 0 to 20 parts by weight of mineral pigments and/or alkaline earth metal oxides, mixed while dry and while maintaining the structure of the components;
(2) introducing the mixture into a desired mold;
(3) compressing the mixture to a density of from 0.15 to 1 g/cm$^3$ to form an article; and
(4) heating the article to from 200° to 900° C., but at least to such a temperature that a chemical reaction resulting in an article having a compressive strength which remains within the range of from 0.5 to 3MN/m$^2$ even under the action of water.

16. Process according to claim 15, wherein said borides of step (c) are selected from the group consisting of zirconium boride, aluminum boride, titanium boride, calcium boride, and a combination thereof.

17. Process according to claim 15, wherein inorganic oxides, mixed oxides, carbides, nitrides, and a combination thereof, having at least one absorption maximum in the wave-length range of from 1.5 to 10 μm and having BET specific surface areas of from 0.2 to 20 m$^2$/g are used as said mineral opacifier.

18. The method according to claim 15, further comprising the step of installing said articles in its intended environment wherein said article acts as a thermal insulator.

19. A method as set forth in claim 1, wherein said borides are selected from the group consisting of zirconium boride, aluminum boride, titanium boride, calcium boride, and a combination thereof.

* * * * *